United States Patent Office 2,863,801
Patented Dec. 9, 1958

---

2,863,801

FUNGICIDAL COMPOSITION COMPRISING AN O-CARBOXYLIC ACID ESTER OF A CYCLIC OXIMIDE

Engelbert Kühle, Koln-Stammheim, Richard Wegler, Leverkusen, and Ferdinand Grewe, Koln-Flittard, Germany, assignors to Farbenfabriken Bayer Aktiengesellschaft, Leverkusen, Germany, a corporation of Germany No Drawing. Application January 23, 1956
Serial No. 560,855

Claims priority, application Germany January 28, 1955

12 Claims. (Cl. 167—33)

The present invention relates to improvements in fungicides, more particularly it concerns fungicides containing or consisting of O-carboxylic acid esters of cyclic oximides of the formula

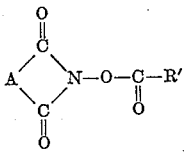

in which A is the residue of an organic dicarboxylic acid and R' is an aliphatic, aromatic, alkoxy or aryloxy radical.

The reaction of anhydrides, halides, esters or free acids of dicarboxylic acids capable of yielding cyclic anhydrides with hydroxyl amine results in compounds having a structure which corresponds to the formula:

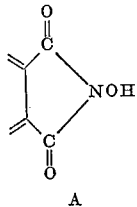

Only a few of these oximides, for instance the oximide of phthalic acid and naphthalic acid, are known from the literature. Some O-carboxylic acid esters of these oximides are likewise described in the literature.

It is a principal object of the present invention to provide highly effective fungicides.

More specific objects of the invention will become apparent as the following description proceeds.

In accordance with the invention it has been found that the carboxylic acid esters of the abovesaid cyclic oximides of the formula:

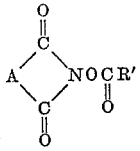

(in which A is the residue of an organic dicarboxylic acid and R' is an aliphatic, aromatic, alkoxy or aryloxy radical) show good fungicidal properties. The fungicidal properties of a number of said carboxylic acid esters are so pronounced that they are highly suitable for use as plant protecting agents.

Examples of oximides which are useful starting products for producing the carboxylic acid esters of cyclic oximides according to the invention are the most varied oximides of dicarboxylic acid esters which are partly novel compounds. The novel cyclic oximides are obtainable by the methods used to produce the known oximides. As examples there may be mentioned the oximides of phthalic acid, of halogenated and nitrited phthalic acid and naphthalene-dicarboxylic acids, of succinic acid, thiodiglycolic acid, diglycolic acid, hydrazodicarboxylic acid, dimethylmaleic acid, 2,3-pyridine-dicarboxylic acid and camphoric acid. Especially suitable are however, the oximides of $\Delta^4$-tetrahydrophthalic acid, 4-chloro-$\Delta^4$-tetrahydrophthalic acid, hexahydrophthalic acid, thiodiglycolic acid, etc. The esters of aromatic carboxylic acids are distinguished by especially high fungicidal activity, but aliphatic carboxylic acid esters likewise show good fungicidal properties. Of the aromatic carboxylic acid esters, especially those bearing nitro or halogen groups are especially useful. Besides, carbonic acid esters and derivatives thereof, are active fungicides.

Suitable O-carboxylic acid esters according to the invention are, for instance, the esters of acetic acid, propionic acid, butyric acid, valeric acid, benzoic acid, toluic acid, chlorobenzoic acids, nitrobenzoic acids, benzoic acids substituted by chloro- and nitrogen atoms, naphthalene and carboxylic acids. The production of these esters including the new esters can be effected by conventional methods. Typical methods are found in Chem. Abstracts, vol. 25, p. 3993; Brockmann, Dissertation Koenisberg, 1898, p. 43; Chem. Zentralblatt 1914I, p. 540; Gazetta Chim. Italiana, 25II, p. 23 (1895).

For instance, the esterification reaction can be carried out in known manner, using the alkali metal salts, alkaline-earth metal salts or other salts of the oximides in aqueous or non-aqueous solution. Furthermore, tertiary bases, such as pyridine or N-dimethyl-cyclo-hexylamine, may be used to effect the reaction. In this case, the esterification reaction is preferably conducted in benzene or chlorobenzene or acetone.

The fungicidal esters can be used either after drying as dust or in aqueous suspension or emulsion, if desired in combination with other plant protecting agents.

The O-carboxylic acid esters can be applied as dry agents at the concentrations within the range of 0.001–1.0 percent. The esters can be extended with talcum. Instead of talcum, bentonite, chalk, clay, kieselguhr, and the like may be used as carrier.

When applied as wet agent, water, alcohol, hydrocarbons, or lower ketones, can, for example, be used as solvent or diluent. When used in form of a slurry agent, suitable emulsifiers are added.

The liquid or dry agent may contain from 1–99% of the O-carboxylic acid ester. It is advantageous to use mixtures containing 10–50% of the active substance.

*Example*

The following table shows the fungicidal activity of some oximide-O-carboxylic acid esters in aqueous emulsion in the glass-slide germination test at various concentrations on *Phytophthora inf.* and *Fuscladium dendr.*

The figures refer to the percentage of non-germinated spores.

| Compound | Concentration | | |
|---|---|---|---|
| | 0.0005% | 0.00025% | 0.0001% |
| 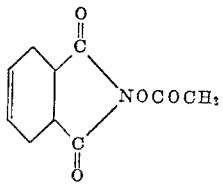 | Phyt. 60.0<br>Fus. 60.0 | 0<br>0 | |
| 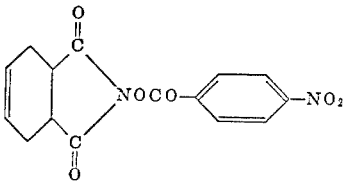 | Phyt. 76.9<br>Fus. 29.6 | 47.4<br>6.2 | 22.6<br>4.1 |
| 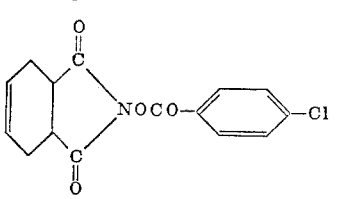 | Phyt. 83.2<br>Fus. 29.3 | 79.7<br>19.5 | 72.0<br>12.6 |
| 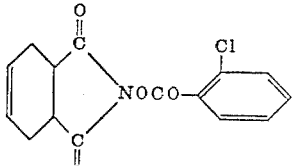 | Phyt. 57.7<br>Fus. 14.0 | 57.7<br>10.0 | 41.0<br>3.6 |
| 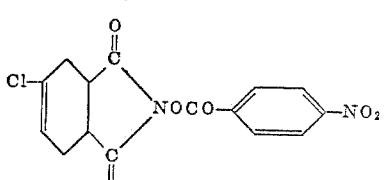 | Phyt. 84.5<br>Fus. 26.8 | 47.5<br>6.4 | 17.2<br>5.3 |
| 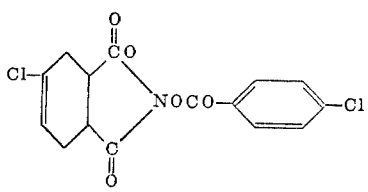 | Phyt. 91.3<br>Fus. 22.1 | 76.3<br>16.2 | 53.4<br>5.5 |
| 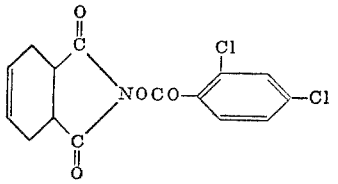 | Phyt. 54.6<br>Fus. 18.1 | 40.2<br>11.2 | 22.6<br>3.5 |
| 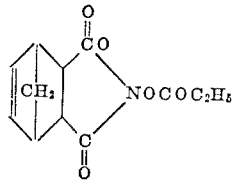 | Phyt. 52.5<br>Fus. 10.3 | 15.5<br>7.0 | 11.1<br>4.1 |
| 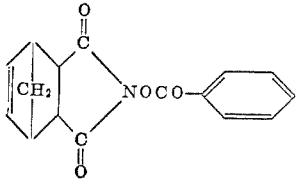 | Phyt. 96.9<br>Fus. 14.0 | 89.7<br>10.0 | 52.0<br>3.6 |

| Compound | Concentration | | |
|---|---|---|---|
| | 0.0005% | 0.00025% | 0.0001% |
| 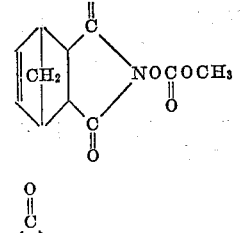 | Phyt. Fus. | 92.3 10.1 | 76.1 5.6 |
| 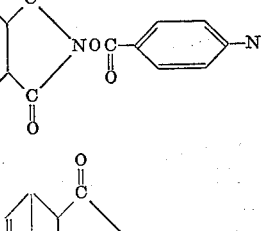 | Phyt. Fus. | 62.5 | 5.8 |
| 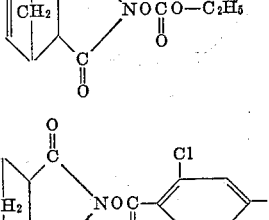 | Phyt. Fus. | 99.8 76.1 | 95.3 |
| 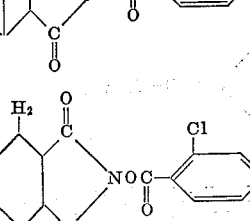 | Phyt. Fus. | 85.6 22.8 | 33.7 3.7 |
| 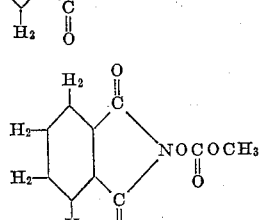 | Phyt. Fus. | 21.8 78.6 | 3.9 18.3 |
| 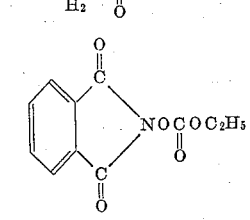 | Phyt. Fus. | 99.7 62.8 | 83.6 33.9 |
| 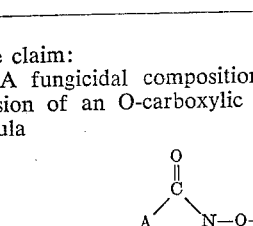 | Phyt. Fus. | 83.5 3.6 | 72.8 |

We claim:

1. A fungicidal composition comprising an aqueous emulsion of an O-carboxylic acid ester of the general formula

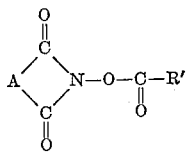

in which A is the residue of an organic dicarboxylic acid ester and R' is a member selected from the group consisting of an aliphatic, aromatic, alkoxy and aryloxy radical, and an emulsifying agent.

2. A fungicidal composition according to claim 1 in which the O-carboxylic acid ester is

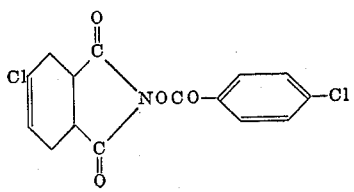

3. A fungicidal composition according to claim 1 in which the O-carboxylic acid ester is

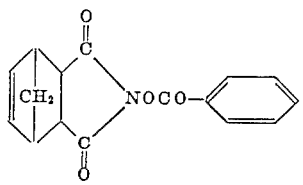

4. A fungicidal composition according to claim 1 in which the O-carboxylic acid ester is

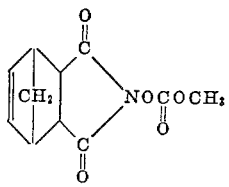

5. A fungicidal composition according to claim 1 in which the O-carboxylic acid ester is

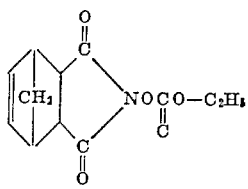

6. A fungicidal composition according to claim 1 in which the O-carboxylic acid ester is

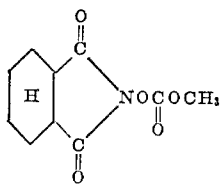

7. The process of controlling fungus on living plants which comprises applying to the plant a fungicidal composition having as an active ingredient an O-carboxylic acid ester of the general formula

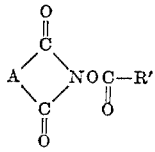

in which A is the residue of an organic dicarboxylic acid, and R' is a member selected from the group consisting of an aliphatic, aromatic, alkoxy and aryloxy radical.

8. The process of claim 7 wherein the active ingredient is the O-carboxylic acid ester of the formula

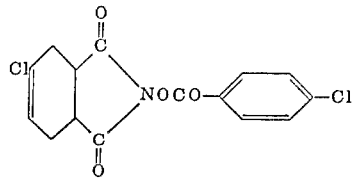

9. The process of claim 7 wherein the active ingredient is the O-carboxylic acid ester of the formula

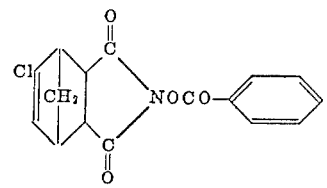

10. The process of claim 7 wherein the active ingredient is the O-carboxylic acid ester of the formula

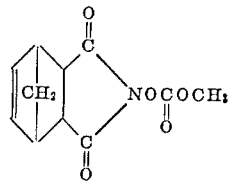

11. The process of claim 7 wherein the active ingredient is the O-carboxylic acid ester of the formula

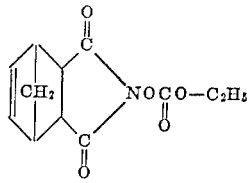

12. The process of claim 7 wherein the active ingredient is the O-carboxylic acid ester of the formula

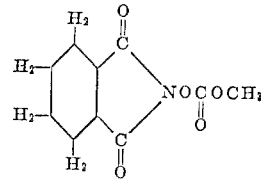

References Cited in the file of this patent
UNITED STATES PATENTS 2,763,589   O'Brien et al. _____ Sept. 18, 1956

OTHER REFERENCES

Putokhin: Chem. Abstracts, vol. 25, page 3993 (1931).

UNITED STATES PATENT OFFICE
Certificate of Correction

December 9, 1958

Patent No. 2,863,801

Engelbert Kühle et al.

It is hereby certified that error appears in the printed specification of the above numbered patent requiring correction and that the said Letters Patent should read as corrected below.

Column 3, formulae six and eight, respectively, should appear as shown below instead of as in the patent:

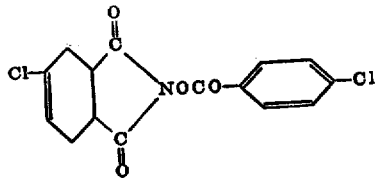

and

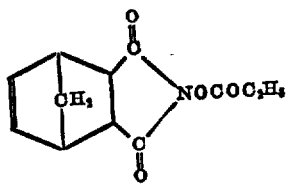

Signed and sealed this 19th day of May, 1959.

[SEAL]

Attest:
KARL H. AXLINE,
Attesting Officer.

ROBERT C. WATSON,
Commissioner of Patents.